United States Patent

[11] 3,619,501

[72] Inventor Henri J. Nussbaumer
La Gaude, France
[21] Appl. No. 47,406
[22] Filed June 18, 1970
[45] Patented Nov. 9, 1971
[73] Assignee International Business Machines Corporation
Armonk, N.Y.
[32] Priority June 27, 1969
[33] France
[31] 6921899

[54] MULTIPHASE MODULATED TRANSMISSION ENCODER
4 Claims, 7 Drawing Figs.

[52] U.S. Cl. 178/67, 178/68, 325/38 R, 325/60
[51] Int. Cl. H04l 27/20
[50] Field of Search 178/66, 67, 68; 325/30, 40, 59, 60; 179/15 BC, 15 BW

[56] References Cited
UNITED STATES PATENTS

| | | | |
|---|---|---|---|
| 3,343,093 | 9/1967 | Van Gerwen | 325/60 |
| 3,344,352 | 9/1967 | Daguet | 325/38 |
| 3,423,529 | 1/1969 | O'Neill, Jr. | 178/68 |

*Primary Examiner*—Benedict V. Safourek
*Attorneys*—Hanifin and Jancin and Robert B. Brodie

ABSTRACT: A multiphase modulated transmission can be obtained with three data sets X, Y, and Z such that data elements of the set Y+Z drive two phase channels and data elements from the set Y'+Z', derived from the three sets X, Y, Z and selected according to a predetermined logical function, drive two other phase channels. By adjusting the weighting of algebraic adders terminating corresponding channel pairs, multiphases up to eight can be approximated.

MULTIPHASE MODULATED TRANSMISSION ENCODER

BACKGROUND OF THE INVENTION

This invention relates to digital data transmission systems, and, more particularly, to the phase modulation transmission encoding of digital data suitable for use, for example, on telephone transmission lines.

Telephone voice channels typically present narrow bandwidths. Accordingly, it has been found expedient to analog modulate digital date in order to effect compatible transmission over such channels. It is well known that for any given channel bandwidth and noise actor there is a maximum number of bits per second per cycle that can be communicated. It if further known that to merely phase encode a single serial data stream could not maximize the through put. This led to the construction of multiphase transmission systems in which the data rate would go up at the expense of either the signal to noise ratio or error rate. Relatedly, a basic discussion of phase modulation problems in the data transmission context may be found in "Data Transmission" by Bennett and Davey, McGraw Hill, New York, 1965, Inter-University Electronic Series, Volume 2, LC No. 64–22948 at pages 201–212.

In order to take advantage of multiphase modulation in the prior art it was necessary to partition data elements in a serial stream into subsets and, in effect, phase encode the subsets separately upon a common carrier. Thus, for example, in U.S. Pat. application No. 035,758, filed on May 8. 1970 in the name of M. Choquet entitled "Data Transmission System" there is shown a system for encoding a sequence of data elements occurring at a data rate 1/T with a corresponding series of weighted pulses of the general form $$k\frac{\sin(\omega t)}{\omega t}.$$

This system further modulated a carrier signal of frequency $n$. The data elements were partitioned into two separate sets. Each data element of the first set was modulated by a signal of the $$\left[q\frac{\sin(\omega t)}{\omega t}\right]\cos(nt).$$

Likewise, each data element of the second set was modulated by a signal of the $$\left[q^1\frac{\sin(\omega t)}{\omega t}\right]\sin(nt),$$

where $$\omega=\frac{2\pi}{T}$$

and $q$ and $q^1$ assumed the binary value of the data element. These signals were appropriately summed at an algebraic adder over an appropriate signal space to form a composite signal. This composite signal approximated the signals used with a four-phase modulated transmission system.

It is, accordingly, an object of this invention to devise a digital transmission encoder for multiplexing the output of a plurality of digital data sources onto a transmission line. It is a more specific object of this invention to devise an encoder for multiplexing a plurality of signals digitally approximating the function $$\frac{\sin(\omega t)}{\omega t}$$

with a minimum of information loss and distortion. It is a still more specific object of this invention to devise a system responsive to a single serial data stream which can be multipally phase encoded on a transmission line so as to substantially increase the throughput.

SUMMARY OF THE INVENTION

The foregoing objects are satisfied by a method and apparatus in which serial data is partitioned into sets X, Y, and Z. Signals representing data elements of set Y and Z drive two-phase channels. At the same time, signals of set $Y^1+Z^1$ obtained from the three sets X, Y, and Z, are combined according to a predetermined logical function. These signals drive two other phase channels. By adjusting the weighting of algebraic adders terminating corresponding channel pairs multiphase modulations up to eight in number can be approximated.

When a sequence of data elements *a*, *b*, *c*, *d*, *e*, etc. occurring at a data rate 1/T are to be encoded according to the invention, they are first represented by signals of the form $$\frac{\sin(\omega t)}{\omega t}$$

where $$\omega=\frac{2\pi}{T}$$

More particularly, each data element is represented by a series of weighted pulses which approximate the function $$\frac{\sin(\omega t)}{\omega t}$$

Such signals further modulate a sinusoidal carrier signal of frequency $n$. The data elements, prior to modulation are partitioned into three sets and by use of a logical combining rule two sets are derived and which, in turn, are appropriately phase modulated and summed to form a composite or global signal for transmission purposes.

Illustratively, a data sequence *a*, *b*, *c*, *d*, *e*, is partitioned into three sets X, Y, Z such that set X includes *a*, *d*, *g*, etc.; set Y includes *b*, *e*, *h*, etc.; and set Z includes *c*, *f*, *i*, etc. A first disjunctive set Y+Z is formed by putting together the elements of set Y and Z. A second disjunctive set $Y^1+Z^1$ is formed by combining the data elements of sets X, Y, and Z according to $Y^1=X-Y+\overline{XY}$ and $Z^1=X\overline{Z}+Z\overline{X}$. Each data element of the first disjunctive set Y+Z is modulated by a signal of the form $$q\frac{\sin(\omega t)}{\omega t}\cos(nt)$$

Likewise, each data element of the second disjunctive set $Y^1+Z^1$ is modulated by a signal of the form $$q^1\frac{\sin(\omega t)}{\omega t}\sin(nt)$$

Relatedly, $q$ and $q^1$ are magnitudes corresponding to the data element value being modulated. In the preferred embodiment $q$ takes the absolute magnitude 0.7 and $q^1$ takes the absolute magnitude 0.3. The weighted cosine $nt$ signal and the weighted sine $nt$ signals are separately summed over an appropriate signal space and then algebraically added and then passed through a low-pass filter for transmission purposes. The combined signal approximates an eight-phase modulated signal.

DESCRIPTION OF THE PREFERRED EMBODIMENT

Figure 1:
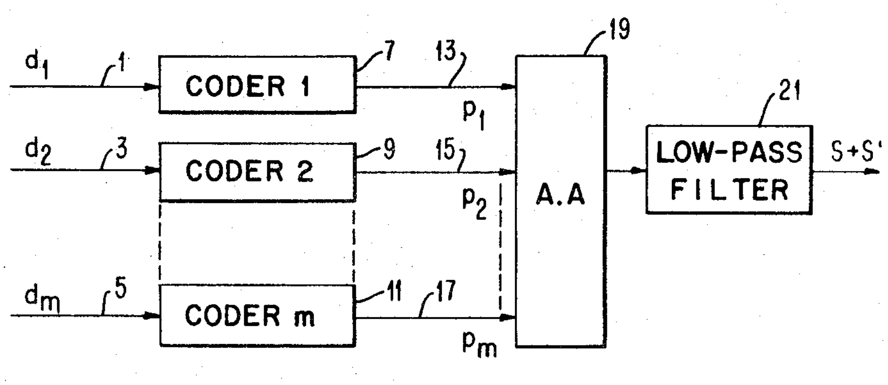
FIG. 1 shows the formation of a composite signal $S+S^1$ obtained from an algebraic adder terminating a plurality of phase encoders.

Referring now to FIG. 1 of the drawing, there is shown a plurality of phase-modulating encoders 7, 9, and 11 responsive to data elements present on corresponding input lines 1, 3, and 5. The encoder outputs are algebraically combined in adder 19 over paths 13, 15, and 17. Low-pass filter 21 provides an integrated and smooth combined or global signal output suitable for transmission purposes.

Now let us consider the dynamic operation of this phase-modulating configuration having in mind the principles set forth in copending Pat. Application No. 035758, filed on May 8, 1970 in the name of M. F. Choquet entitled "Data Transmission system." Each coder in response to the data input forms a first digital signal which, upon filtering, corresponds to $$\sum_k \Gamma_k = q\,\frac{\sin \omega t}{\omega t}\cos nt$$

and another digital signal corresponding to $$\sum_k \Gamma_k{}^1 = q^1\,\frac{\sin \omega t}{\omega t}\sin nt$$

Considering now that each encoder is in parallel generating to such signals it is impossible to sum signals of the same type which, when summed and weighted by algebraic adder 21, can be expressed as follows:

$$s = p_1\Sigma_1\Gamma_1 + p_2\Sigma_2\Gamma_2 \cdots + p_m\Sigma_m\Gamma_m$$
$$s' = p_1\Sigma_1\Gamma'_1 + p_2\Sigma_2\Gamma'_2 \cdots + p_m\Sigma_m\Gamma'_m$$

Assuming that the coders are operative in synchronism such that at any instant *t* each coder produces a digital signal element of the same nature, there should be generated from adder 19 the following:

$$s = \Sigma p_1\Gamma_1 + p_2\Gamma_2 \cdots + p_m\Gamma_m$$
$$s' = \Sigma p_1\Gamma'_1 + p_2\Gamma'_2 \cdots + p_m\Gamma'_m$$

This mathematical consideration suggests the desirability of applying the data elements from different subsets in parallel and synchronism.

Figure 2:
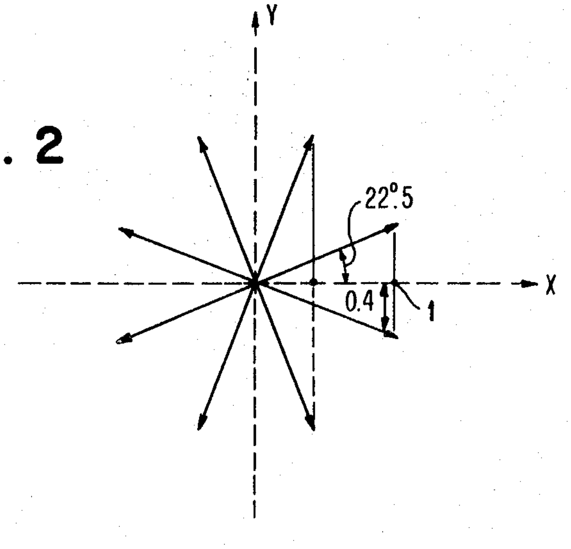
FIG. 2 shows the the phase angle relationship between the data encoded in an eight-phase system.
Figure 3:
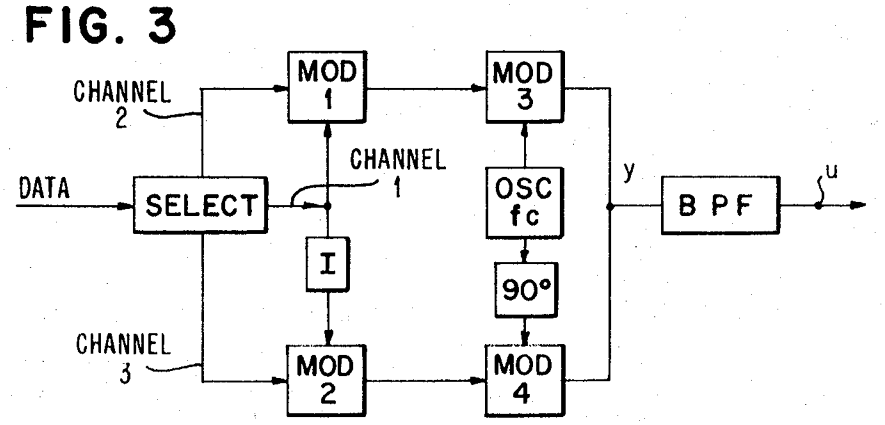
FIG. 3 illustrates a typical three-level modulator for eight-phase encoding.

Referring now to FIG. 2 of the drawing, there is shown a vector diagram of a typical eight-phase modulator. Such a modulator embodiment is shown, for example, in FIG. 3. An eight-phase modulator in the prior art, requires a three-level coding or, in effect, a double modulation. The first modulation results from partitioning the data according to some scheme into separate sets and assigning a FFl+FF4 value (see FIG. 5*b*) to each corresponding data element. The modulation products in turn modulate a carrier in quadrature and produce an output signal which is, in turn, filtered and imposed on a transmission medium.

Figure 4:
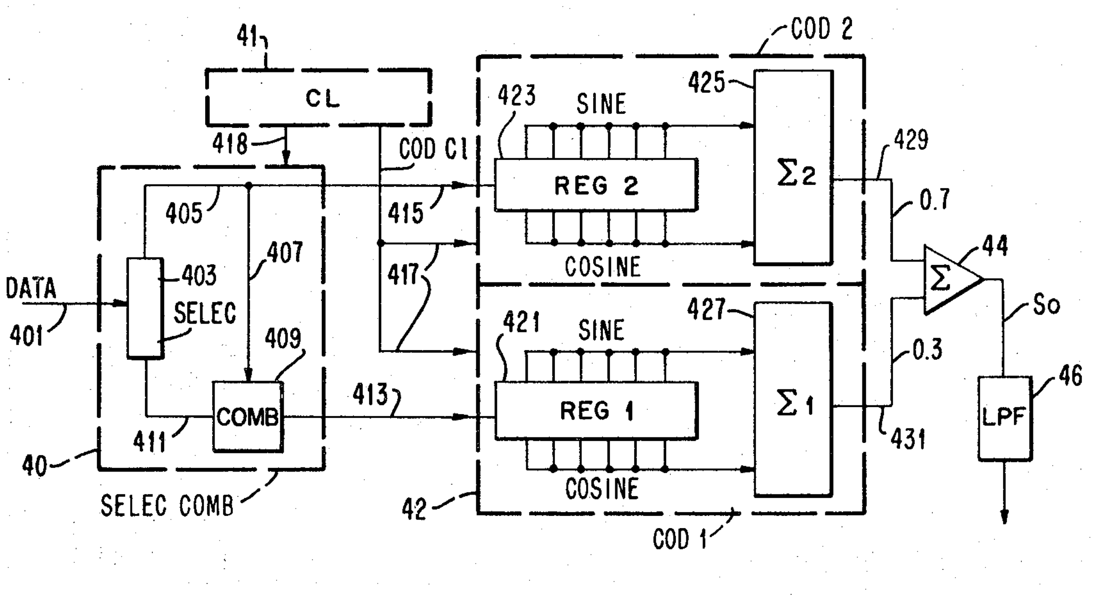
FIG. 4 exhibits a general block diagram according to the invention showing the partitioning of the data and recombination according to predetermined logical function prior to application to the modulating encoders.

Referring now to FIG. 4 of the drawing, there is shown a general block diagram according to the invention. In this embodiment the data is partitioned in selector combiner 40 and recombined according to a logical function prior to being applied to modulator 42. In modulator 42 the signal is approximated by the $$\frac{\sin \omega t}{\omega t}$$

function and appropriately summed. The outputs of the modulator are applied over paths 429 and 431 to summing unit 44. Low-pass filter 46, otherwise smooths and band limits summer 44's output.

A clock unit, 41, provides timing signals over paths 417 and 418 to maintain combiner unit 40 and modulator 42 in synchronism. For purposes of completeness, it should be noted that the construction of modulator 42, algebraic adders 425 and 427, summing unit 44, and low-pass filter 46 are set forth in extensive detail in the hereinbefore mentioned Choquet copending patent application.

Operationally, data elements symbolically represented as a serial stream *a*, *b*, *c*, *e*, etc. are applied over data path 401 to selector unit 403. Selector 403 partitions the serial data according to a predetermined selection rule. In this regard, reference should be made to FIG. 6 in which the input data is graphically represented as successively labeled elements. Selector 403 partitions the data into three sets X, Y, and Z. The data elements of set X appear on conductor 411 as one input of combining network 409. The data elements of sets Y and Z are applied to conducting path 405. Thus, data elements *a*, *d*, *g*, *j*, etc. form set X on path 411 while data elements *b*, *c*, *e*, *f*, *h*, *i*, form sets Y and Z on path 405. Selector 403 may be constructed from a simple counting arrangement using gates operatively responsive to a predetermined repetitive count for switchably connecting path 401 to either paths 405 or 411. As presently illustrated, path 401 would be coupled to path 411 on every first, fourth, seventh, eleventh, etc. data element. At the same time, path 401 would be coupled to path 405 during the second, third, fifth, sixth, eighth, ninth, etc. data time periods.

Figure 6:
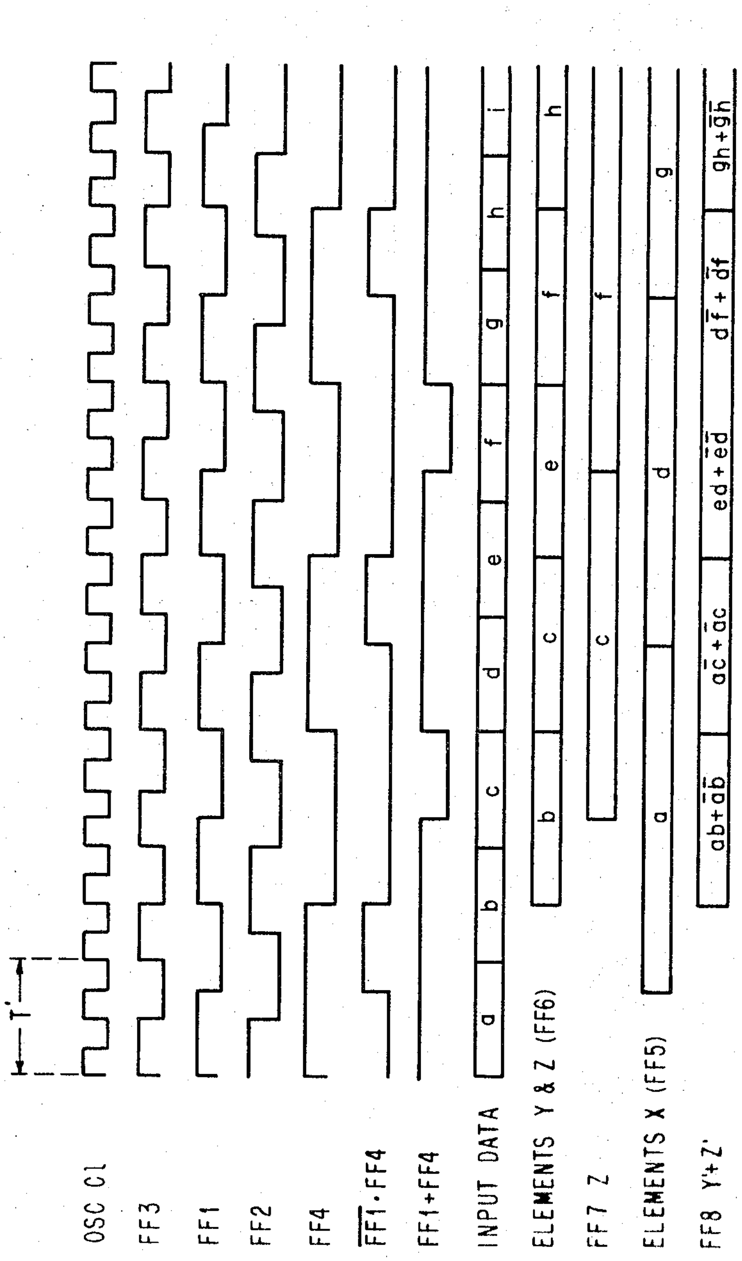
FIG. 6 shows a general timing waveform and data element combination and recombination diagram for selected logic elements shown in FIGS. 5*a* and 5*b*.

Two outputs respectively on paths 415 and 413 are applied to corresponding registers of modulator 42. The signal on path 415 consists of the data elements of sets Y+Z. The data elements of sets $Y^1+Z^1$ appear on path 413. Combining network 409 derives the data elements for set $Y^1+Z^1$ according to the relationships $Y^1=X\bar{Y}+\bar{X}Y$ and $Z^1=X\bar{Z}+Z\bar{X}$. Accordingly, the combining network 409 is presented with the data elements of set X on path 411 and of sets Y and Z on path 407. The data representing $Y^1+Z^1$ are shown in FIG. 6. Reference may be made to "A Logical Design for Digital Computers" by Montgomery Phister, Jr., John Wiley and Sons, New york, 1958 at chapters 1–3, for the appropriate principles and for the interior design of such a logical combining network. For the details of the modulator 42, summing network 44, low-pass filter 46, reference is again made to the copending Choquet patent application.

Figure 5B:
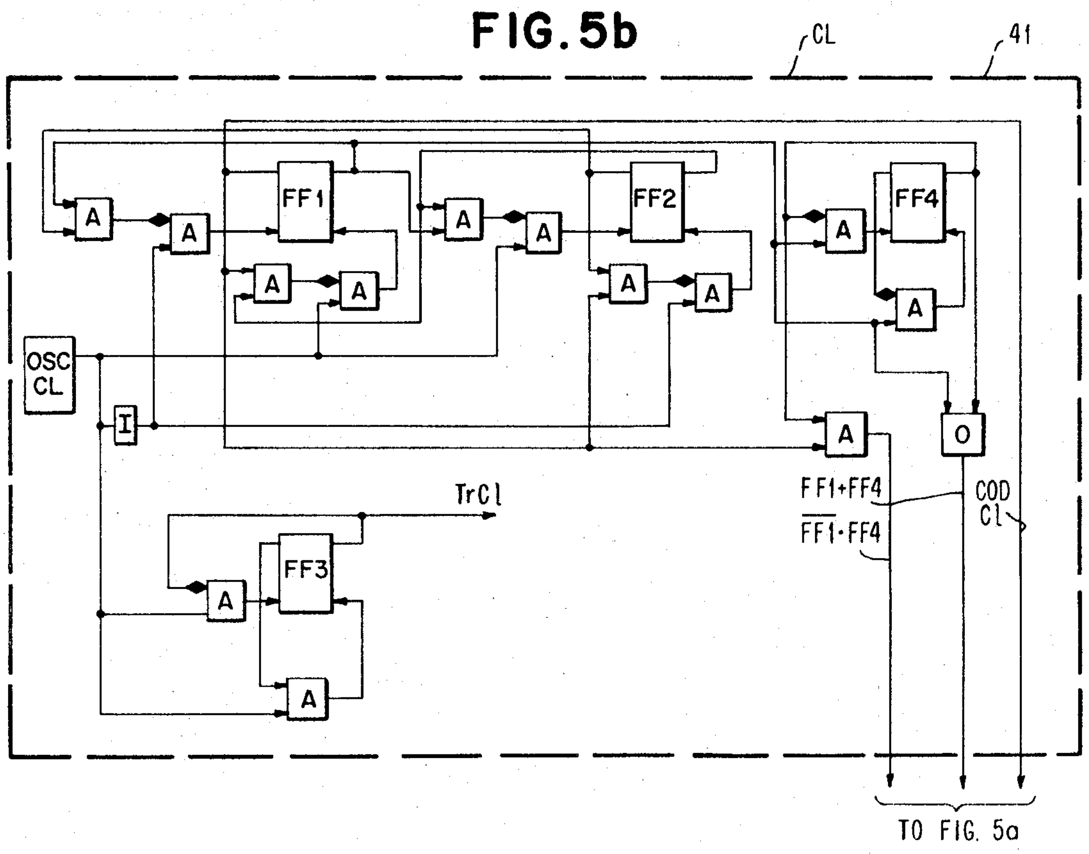
FIGS. 5*a* and 5*b* are a detailed logical diagram according to the invention shown in FIG. 4.
Figure 5A:
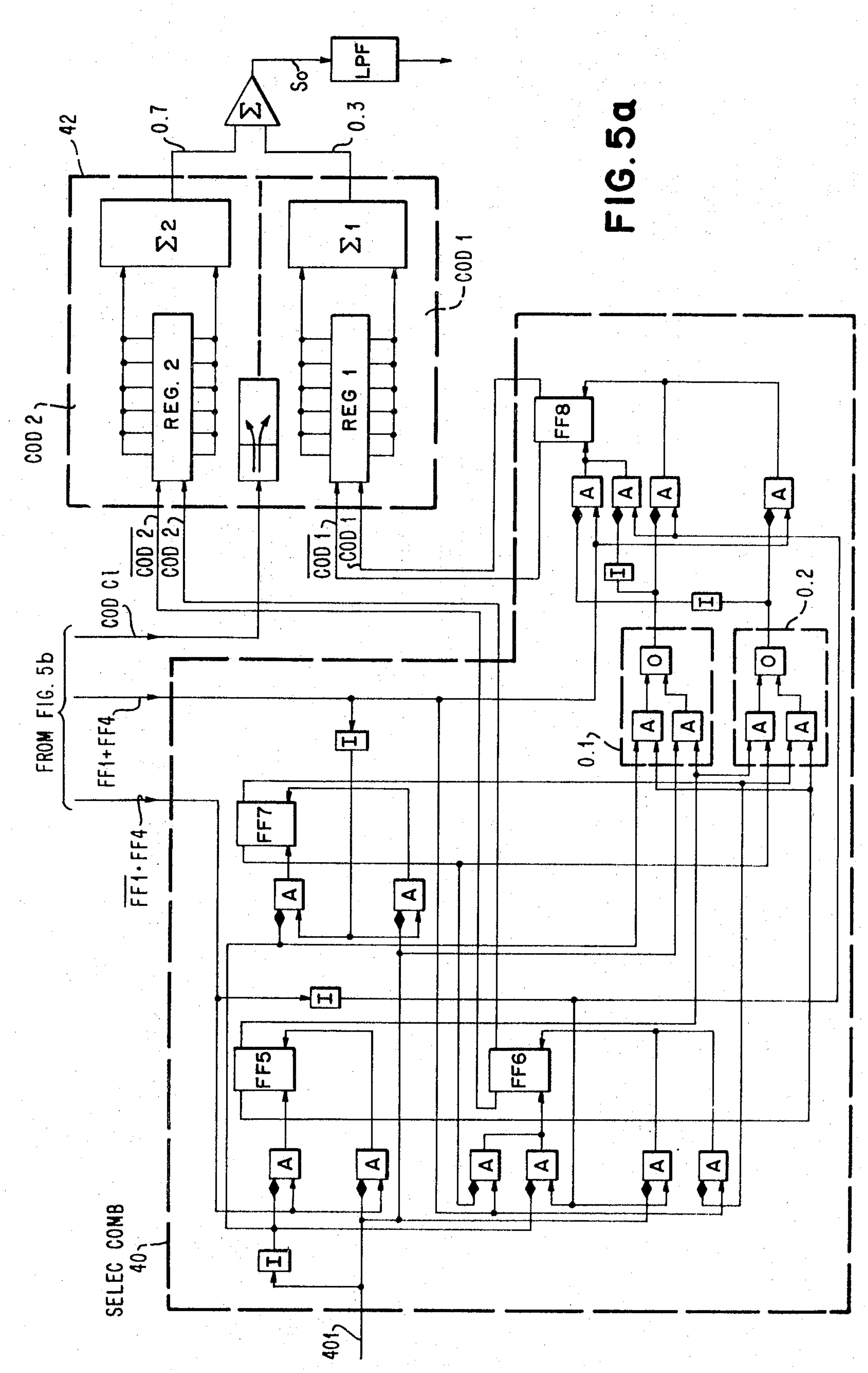

Referring now to FIGS. 5*a* and 5*b* of the drawings, there is set forth a detailed logical diagram according to the invention shown in FIG. 4. In FIG. 5*a* there is exhibited the detailed logic of selector combiner 40 in relation to clock 41 and modulator 42. In FIG. 5*b* the details of clock 41 are set forth.

Referring now to FIG. 5*b*, it should be appreciated that the timing signals necessary to control the selection circuit with reference to a connecting path 401 are exhibited in FIG. 6 in terms of the timing wave form diagrams associated with $\overline{FF1}\cdot FF4$ and FF1+FF4. These signals are transmitted over correspondingly designated lines from the clock shown in FIG. 5*b*.

The data elements constituting set Y are supplied to FF6 from input path 401 at the instant when $\overline{FF1}\cdot FF4$ is going off and FF1+FF4 is going on. The data elements of set Z are normally steered to flip-flop FF7. The data elements to be found in sets Y and Z are entered into flip-flop FF6. The data elements constituting sets $Y^1$ and $Z^1$ are produced simultaneously in logic units 01 and 02. These, in turn, are coupled to register 1 of modulator 42 through flip-flop FF8. Similarly, the data elements of sets Y and Z are applied to register 2 of modulator 42 from FF6.

The concatenations of the sundry logic elements are clearly shown in FIGS. 4 and 4*b* in combination with the timing diagram of the FIG. 6 and should otherwise be understood by one skilled in the art. Suffice to say that the logic elements are of the well known variety and the functional explanations can be found in the previously mentioned Phister reference.

With the foregoing embodiment in mind it is evident that numerous variations can be made by one having ordinary skill in this art without departing from the spirit and scope of this invention as set forth in the appended claims.

What is claimed is:

1. In a data transmission system of the phase-modulation type using carrier signals of frequency $n$ and in which a series of weighted pulses approximating the function $$\frac{\sin(\omega_t)}{\omega t}$$

are used to represent individual ones of a sequence of date elements occurring at data rate 1/T and partitionable into two sets, for example, X, Y, Z; the combination comprising:

means for deriving a first signal group Y+Z from the data elements of the sets Y and Z;

means for deriving a second signal group $Y^1+Z^1$ from the data elements of the sets X, Y, and Z according to the relations: $Y^1=XY+\overline{X}\overline{Y}$ and $Z^1=X\overline{Z}+Z\overline{X}$;

means for modulating each first signal group data element by a signal of the form $$q\frac{\sin(\omega t)}{\omega t}\sin(nt)$$

and for modulating each second group data element by a signal of the form $$q\frac{\sin(\omega t)}{\omega t}\cos(nt),$$

and for modulating each second group data element by a signal of the form $$q^1\frac{\sin(\omega t)}{\omega t}\sin(nt),$$

where $q$ and $q^1$ are magnitudes corresponding to the signal group data element values and $$\omega=\frac{2\pi}{T};$$

and means for combining said modulated signals summed over the signal space $i$ and defined as $$\sum_i\left[\frac{q_i\sin\omega\frac{(t-i\pi)}{\omega}}{\omega\frac{(t-i\pi)}{\omega}}\right]\cos nt+\sum_i\left[\frac{q_i^1\sin\omega\frac{(t-i\pi)}{\omega}}{\omega\frac{(t-i\pi)}{\omega}}\right]\sin nt$$

2. In a transmission system according to claim 1, wherein the modulating means assign the magnitude 0.7 for $q$ and 0.3 for $q^1$.

3. In a system for encoding a sequence of data elements $a$, $b$, $c$, $d$, $e$, etc., occurring at data rate 1/T with corresponding signals of a general form $$\frac{\sin(\omega_t)}{\omega t}$$

and further modulating a carrier of frequency $n$, the data elements being partitionable into sets such that, for example, set X includes $a$, $d$, $g$, etc., set Y includes $b$, $e$, $h$, etc., and Z includes $c$, $f$, $i$, etc., the combination comprising:

means for deriving a first signal group Y+Z from the data elements from the sets Y and Z;

means for deriving a second signal group $Y^1+Z^1$ from the data elements from sets X, Y and Z according to the relation $Y^1=XY+\overline{X}\overline{Y}$ and $Z^1=X\overline{Z}+Z\overline{X}$;

means for modulating each first signal group data element by a signal of the form $$q\frac{\sin(\omega t)}{\omega t}\cos(nt),$$

and for modulating each second group data element by a signal of the form $$q^1\frac{\sin(\omega t)}{\omega t}\sin(nt)$$

where $q$ and $q^1$ are assigned the respective magnitudes of 0.7 and 0.3 and $$\omega=\frac{2\pi}{T};$$

and means for combining said modulated signals summed over the signal space $i$ and defined as $$\sum_i\left[\frac{q_i\sin\omega\frac{(t-i\pi)}{\omega}}{\omega\frac{(t-i\pi)}{\omega}}\right]\cos nt+\sum_i\left[\frac{q_i^1\sin\omega\frac{(t-i\pi)}{\omega}}{\omega\frac{(t-i\pi)}{\omega}}\right]\sin nt$$

4. A method for phase-modulating data elements $a$, $b$, $c$, $d$, $e$, etc., serially occurring at data rate 1/T upon a carrier signal of frequency $n$, comprising the steps of:

partitioning the data elements into sets such as X including data elements $a$, $d$, $g$, *etc.; Y including data elements* $b$, $e$, $h$, *etc.; and Z including data elements* $c$, $f$, $i$, *etc.;* forming a first disjunctive set Y+Z;

forming a second disjunctive set $Y^1+Z^1$, where $Y^1=\overline{X}\overline{Y}+XY$ and $Z^1=X\overline{Z}+Z\overline{X}$;

modulating each data element of the first disjunctive set by a signal of the form $$q\frac{\sin(\omega t)}{\omega t}\cos(nt),$$

and for modulating each data element of the second disjunctive set by a signal of the form $$q^1\frac{\sin(\omega t)}{\omega t}\sin(nt),$$

where $q_j$ and $q_j^1$ are magnitudes corresponding to the $j$th data element value and $$\omega=\frac{2\pi}{T};$$

summing over the $i$th signal space the modulated signals so as to form the composite signal $$\sum_i\left[\frac{q_i\sin\omega\frac{(t-i\pi)}{\omega}}{\omega\frac{(t-i\pi)}{\omega}}\right]\cos nt+\sum_i\left[\frac{q_i^1\sin\omega\frac{(t-i\pi)}{\omega}}{\omega\frac{(t-i\pi)}{\omega}}\right]\sin nt$$

* * * * *